Figure 1:
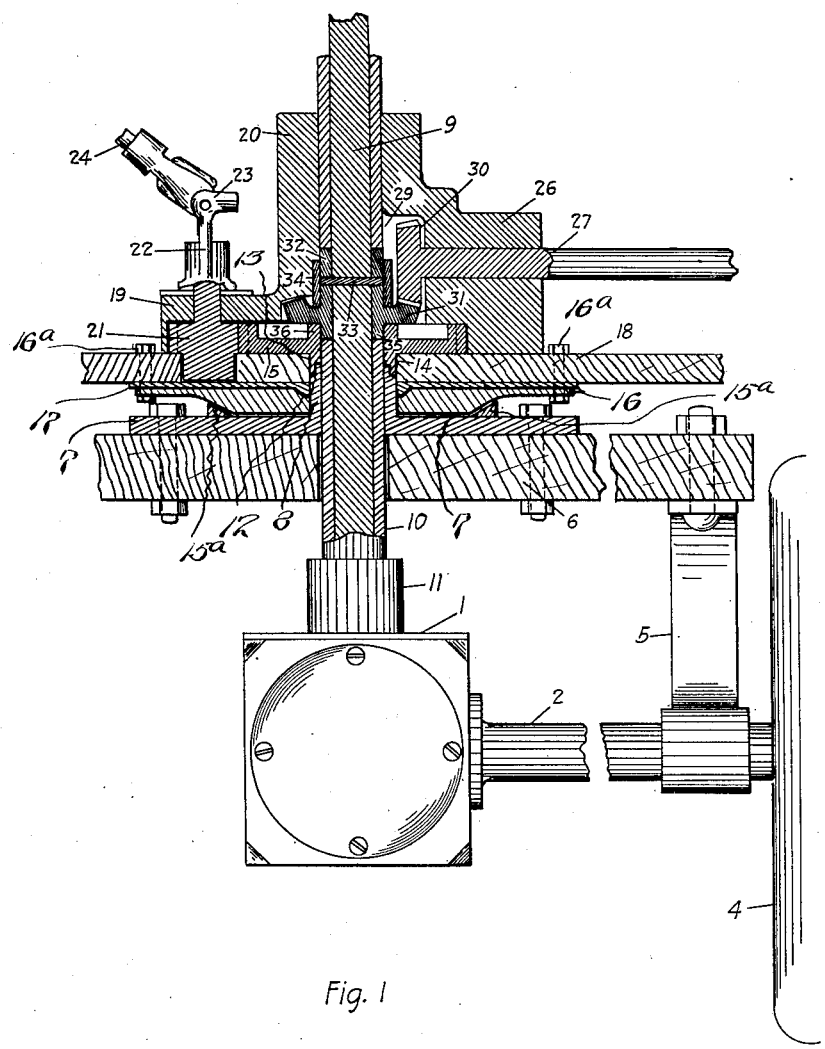

F. J. BAKER.
FRONT WHEEL DRIVING AND STEERING MECHANISM FOR HORSELESS VEHICLES.
APPLICATION FILED AUG. 25, 1919.

1,360,710.

Patented Nov. 30, 1920.
2 SHEETS—SHEET 1.

F. J. BAKER.
FRONT WHEEL DRIVING AND STEERING MECHANISM FOR HORSELESS VEHICLES.
APPLICATION FILED AUG. 25, 1919.
1,360,710.
Patented Nov. 30, 1920.
2 SHEETS—SHEET 2.
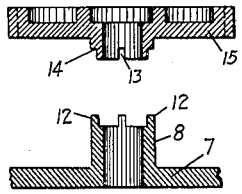
Fig. 3
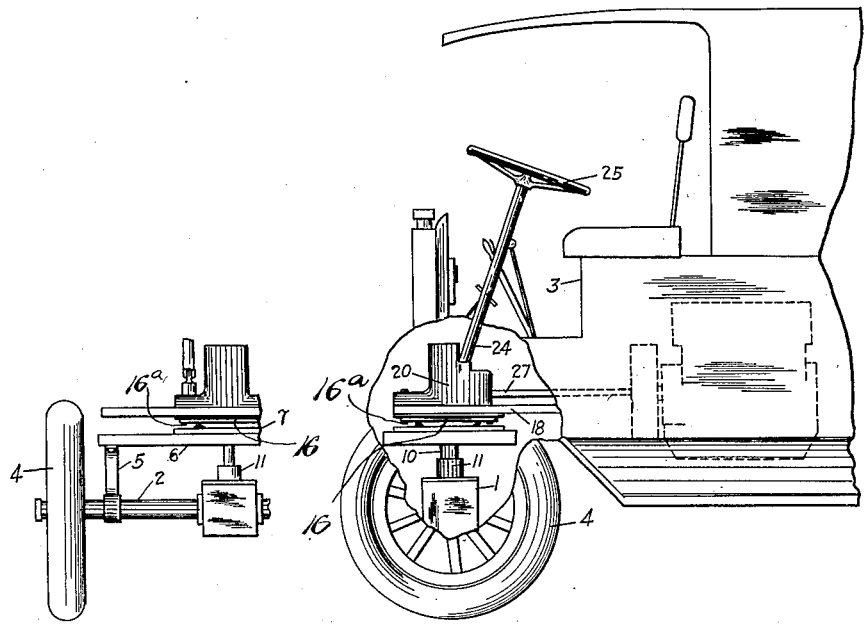
Fig. 4
Fig. 2
Inventor
Frederick J. Baker,
By Howard S. Smith,
His Attorney
Witness
N. L. Rogers

UNITED STATES PATENT OFFICE.

FREDERICK J. BAKER, OF DAYTON, OHIO.

FRONT-WHEEL DRIVING AND STEERING MECHANISM FOR HORSELESS VEHICLES.

1,360,710.	Specification of Letters Patent.	Patented Nov. 30, 1920.

Application filed August 25, 1919. Serial No. 319,577.

*To all whom it may concern:*

Be it known that I, FREDERICK J. BAKER, a citizen of the United States, residing at Dayton, in the county of Montgomery and State of Ohio, have invented certain new and useful Improvements in Front-Wheel Driving and Steering Mechanism for Horseless Vehicles, of which the following is a specification.

This invention relates to new and useful improvements in driving and steering mechanism for horseless vehicles.

The principal object of the invention is to provide a strong, durable and easily operated front wheel driving and steering mechanism for trucks, tractors and other horseless vehicles. It not only affords an efficient driving mechanism for such vehicles, but enables them to be turned quickly and readily in a very small space.

Other important and incidental objects will be brought out in the following specification, and particularly set forth in the subjoined claim.

One form of embodiment of my invention is illustrated in the accompanying drawings, of which Figure 1 is an end elevation, partly in section, of my improved front wheel driving and steering mechanism. Fig. 2 is a side elevational view of the front portion of a truck, partly broken away, showing my improved driving and steering mechanism applied thereto. Fig. 3 is a vertical sectional view taken through the steering device coupling members. And Fig. 4 is a front end elevation of one side of the running gear of a truck containing my improved driving and steering mechanism.

Throughout the specification and drawings, similar reference characters denote corresponding parts.

In a detailed description of my invention, the numeral 1 designates a differential housing which contains the differential mechanism shown and described in my United States Letters Patent No. 1,258,177 granted March 5th, 1918. Connected to this differential mechanism within the housing 1, are the front axle sections 2 2 of a truck 3. While I have shown my driving and steering mechanism applied to the front axle of the truck, it may be equally as well applied to the rear axle of the latter.

Mounted on the outer end of each axle section 2 near the front wheel 4 thereon, is a supporting member 5. To the supporting members 5 5 is bolted a transverse block 6 to which in turn is bolted a horizontal member 7 having an upturned tubular central portion 8 through which and the transverse block 6 there loosely projects downwardly into the housing 1, a vertical drive shaft 9.

Passing downwardly through the tubular portion 8 of the member 7, and through the transverse block 6 is a sleeve 10 having an enlarged lower end 11 connected to the housing 1 for the purpose of supporting it. Through this sleeve 10 and enlarged end 11 the vertical shaft 9 projects downwardly into said housing to operate the differential mechanism therein.

Provided on the upper end of the tubular portion 8 of the coupling member 7, is a series of dogs 12 adapted to engage a series of dogs 13 projecting downwardly from the lower tubular end 14 of a horizontally disposed gear 15. Surrounding the tubular portion 8 of the coupling member 7, and resting upon its base, between triangular projections 15$^a$ integral with the latter, is a supporting member 16 having inclined sides against which the projections 15$^a$ act as flanges to resist lateral strains. To this supporting member 16 there is secured, by means of bolts 16$^a$, a plate 17 having a flanged middle portion that also surrounds the tubular portion 8 of the member 7. Secured upon the right hand portion of this plate 17, is the right front end portion 18 of the frame of the truck. The plate 17 and supporting member 16, are held stationary by the frame of the machine, while the parts hereinbefore described, below it, may be turned to steer the truck by the following means.

Pivotally secured in the left hand lateral base portion 19 of a tubular sleeve member 20 mounted on the frame 18, is the upwardly projecting portion of a gear 21. The latter gear, which meshes with the gear 15, is adapted to be turned by a vertical shaft 22 connected, by a universal joint 23, with the steering shaft 24 of the truck. Accordingly, when the steering shaft 24 is turned by the steering wheel 25, the gear 21 will be actuated to turn the gear 15, which, through its connection with the coupling member 7, will move the block 6 and axle sections 2 to turn the truck in the desired direction. The movement of the parts just described is independent of that of the shaft 9, which is turned to propel the truck by the following means.

The top of the right hand side 26 of the tubular member 20 is raised above the level of its other side 19, to receive in a horizontal bore therein the lateral drive shaft 27. Fast on the inner end of this shaft, within a cavity 29 provided in the tubular member 20, is a beveled gear 30 which meshes with a horizontal beveled gear 31 having an upturned sleeve portion 32 that surrounds, and is secured to, the vertical shaft 9 by a transverse pin 33. Surrounding the sleeve portion 32 of the said gear 31 is a collar 34 by which the transverse pin 33 is held in place. The gear 31 has a downwardly projecting neck portion 35 that rests upon the top of the sleeve 10 and is received between the middle flanged portion 36 of the gear 15 whereby the latter may turn free of the gear 31 during the steering operation, and the latter may turn independently of the gear 15 during the driving operation.

When the transverse driving shaft 27 is operated, it will turn the gear 30 to rotate the gear 31. The latter, being pinned to the vertical shaft 9, will rotate it, and through the differential mechanism to which said shaft is connected, the axle sections 2 on which the front drive wheels 4 are mounted, will be turned to propel the vehicle.

I do not wish to be limited to the details of construction and arrangement herein shown and described, and any changes or modifications may be made therein within the scope of the subjoined claim.

Having described my invention, I claim:

In a device of the type described, the combination with an axle of a horseless vehicle, of a vertical shaft for driving said axle, a transverse block through which said shaft loosely projects, supported by the outer ends of said axle, a coupling member secured to the upper portion of said block, an upturned tubular central portion on said coupling member through which said vertical shaft loosely projects, a horizontal gear through which said vertical shaft also loosely projects, means for coupling said horizontal gear to the tubular portion of the coupling member, a frame for said vehicle, a tubular member through which the vertical shaft projects, mounted in said frame, a lateral base portion on said tubular member, a gear pivotally secured in said base portion, in mesh with the horizontal gear, and a steering device for turning the second gear to rotate the first, and through the latter and transverse block, to move the axle to guide the vehicle without interfering with the driving movement of the vertical shaft.

In testimony whereof I have hereunto set my hand this 23rd day of August, 1919.

FREDERICK J. BAKER

Witness:
HOWARD S. SMITH.